(12) United States Patent
Haas

(10) Patent No.: US 8,141,257 B2
(45) Date of Patent: Mar. 27, 2012

(54) HAND-HELD RECIPROCATING POWER SAW

(75) Inventor: Guenter Haas, Kaufering (DE)

(73) Assignee: Hilti Akietengesellschaft, Schaan (LI)

( * ) Notice: Subject to any disclaimer, the term of this patent is extended or adjusted under 35 U.S.C. 154(b) by 237 days.

(21) Appl. No.: 12/455,609

(22) Filed: Jun. 3, 2009

(65) Prior Publication Data
US 2010/0180455 A1 Jul. 22, 2010

(30) Foreign Application Priority Data
Jun. 4, 2008 (DE) .......................... 10 2008 002 212

(51) Int. Cl.
*B27B 11/00* (2006.01)
*B23D 49/16* (2006.01)
(52) U.S. Cl. .............................................. 30/392; 74/50
(58) Field of Classification Search ............ 30/392–394, 30/377; 74/50, 61
See application file for complete search history.

(56) References Cited

U.S. PATENT DOCUMENTS

| | | | |
|---|---|---|---|
| 3,729,823 A * | 5/1973 | Bos et al. .......................... | 30/394 |
| 3,962,924 A * | 6/1976 | Glover et al. ..................... | 74/50 |
| 5,099,705 A * | 3/1992 | Dravnieks .......................... | 74/50 |
| 5,212,887 A * | 5/1993 | Farmerie .......................... | 30/393 |
| 6,370,781 B1 * | 4/2002 | Sasaki .............................. | 30/392 |
| 7,363,713 B2 * | 4/2008 | Hirabayashi et al. ............ | 30/392 |
| 7,658,012 B2 * | 2/2010 | James et al. ..................... | 30/392 |

* cited by examiner

*Primary Examiner* — Boyer D Ashley
*Assistant Examiner* — Omar Flores Sanchez
(74) *Attorney, Agent, or Firm* — Abelman, Frayne & Schwab

(57) ABSTRACT

A hand-held reciprocating power saw (10) includes a reciprocation member (21) for reciprocatingly moving a working tool, a compensation mass (22), a motor-driven eccentric wheel (23) having a first eccentric (24) for reciprocatingly displacing the reciprocation member (21) and a second eccentric (25) for reciprocating the compensation mass (22) along an axis (A), with the outer surface (28) of the second eccentric (25) engaging in an opening (26) provided in the compensation mass (22) and defined by a circumferential wall (27), and an intermediate member (30) arranged between the circumferential wall (27) and the outer surface (28) of the second eccentric (25) at least in the contact regions (41, 42), between the circumferential wall (27) and the outer surface of second eccentric, with the intermediate member (30) having a first radial extension (R1) oriented parallel to the axis (A) and a second radial extension (R2) oriented perpendicular to the axis (A) and greater than the first radial extension (R1).

6 Claims, 3 Drawing Sheets

HAND-HELD RECIPROCATING POWER SAW

BACKGROUND OF THE INVENTION

1. Field of the Invention

The present invention relates to a hand-held reciprocating power saw including a reciprocation drive having a reciprocation member for reciprocatingly moving a working tool, a motor for driving the reciprocation drive, a compensation mass reciprocating in directions opposite reciprocation directions of the reciprocation member, an eccentric wheel driven by the motor and having a first eccentric for reciprocatingly displacing the reciprocation member and a second eccentric for reciprocating the compensation mass along an axis extending along a displacement path of the reciprocation member, with the second eccentric having a radially wide outer surface and engaging in an opening provided in the compensation mass and defined by a circumferential wall that surrounds the outer surface of the second eccentric, so that between the outer surface of the second eccentric and the circumferential wall there is provided a first contact region in a pressure direction and a second contact region in a pulling direction.

2. Description of the Prior Art

Reciprocating power saws are formed, e.g., as saber saws and include a compensation mass for reducing vibrations which are generated by a drive train that includes a reciprocation member for the sawing tool. The compensation mass is displaced in a direction opposite to that of the drive train and the reciprocation member.

U.S. Pat. No. 5,079,844, from which the present invention proceeds, discloses a mass compensation for compensating vibrations generated by a drive unit of an electrical reciprocating power tool. The drive unit includes an eccentric drive for a reciprocation member that is formed as a push rod with a tool holder for a saw blade attached to the reciprocation member, and an eccentric drive for a compensation mass. The compensation mass is driven in a direction opposite to that of the push rod for balancing the mass of the push rod and the saw blade.

The drawback of the reciprocating power saw described in the above-mentioned U.S. patent consists in that large loads are applied to the contact surface between the outer circumference of the eccentric drive and the inner surface of the opening formed in the compensation mass. This can result is non-lubrication of the contact surface and in resulting high wear.

Accordingly, an object of the present invention is a reciprocating power saw of the type described above and the compensation mass drive of which would be less prone to wear.

SUMMARY OF THE INVENTION

This and other objects of the present invention, which will become apparent hereinafter, are achieved by providing, in a reciprocating power saw of the type described above, an intermediate member arranged between the circumferential wall defining the opening in the compensation mass and the outer surface of the eccentric that drives the compensation mass at least in respective contact regions, with the intermediate member having a first radial extension oriented parallel to the axis of the displacement path of the reciprocation member and a second radial extension oriented perpendicular to the axis and greater than the first radial extension.

The second (compensation mass driving) eccentric has preferably a arcuate cross-section and has a uniform radius which is smaller than or equal to the first radial extension of the intermediate member.

The provision of the intermediate member at least in the contact regions permits to noticeably increase both the bearing surfaces toward the eccentric and the bearing surfaces toward the circumferential wall. This results in a reduced surface load and in improved formation of the lubricant film, which makes the respective surfaces less prone to wear. Further, a greater play or spacing between the intermediate member and the second eccentric in the direction transverse to the axis is achieved. This resiliently damps impacts of the intermediate member in the direction transverse to the axis.

The intermediate member can be formed, e.g., of two parts connectable with each other.

Advantageously, the intermediate member is formed as an annular member forming two arcuate bearing segments located in the two contact regions respectively, and formlockingly engaging with their respective concave sides the outer surface of the second eccentric. This provides a relatively large bearing surface between the second eccentric and the intermediate member in both contact regions.

Advantageously, the arcuate bearing segments each extends over an arc from 10° to 40°, in particular from 20° to 30°. This permits to optimize the bearing surfaces in the contact regions and simultaneously insure a reliable engagement of the intermediate member with the second eccentric.

Preferably, the intermediate member is formed of spring steel. Thereby, a possible backlash can be compensated by a certain preload, and the impacts can be cushioned.

Advantageously, the intermediate member has, at least in a region of each arcuate bearing segment at least two, preferably spaced, bearing surfaces facing the circumferential wall of the opening. These bearing surfaces are preferably flat and are located sidewise of the arcuate bearing segments. This further increases the contact surfaces of the intermediate member facing the circumferential wall.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
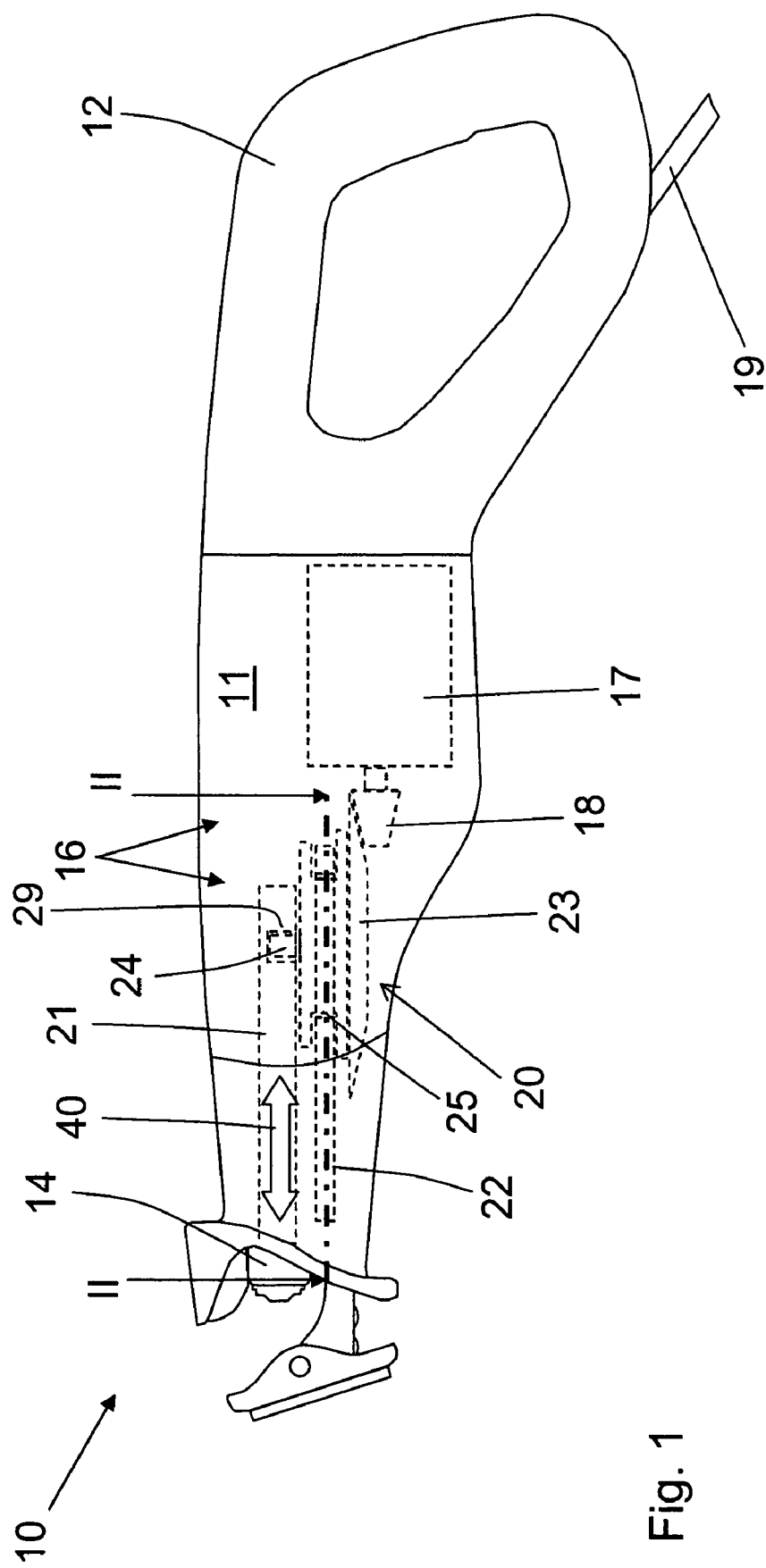
FIG. 1 a side view of a hand-held reciprocating power saw according to the present invention which is formed as a saber saw.
Figure 2:
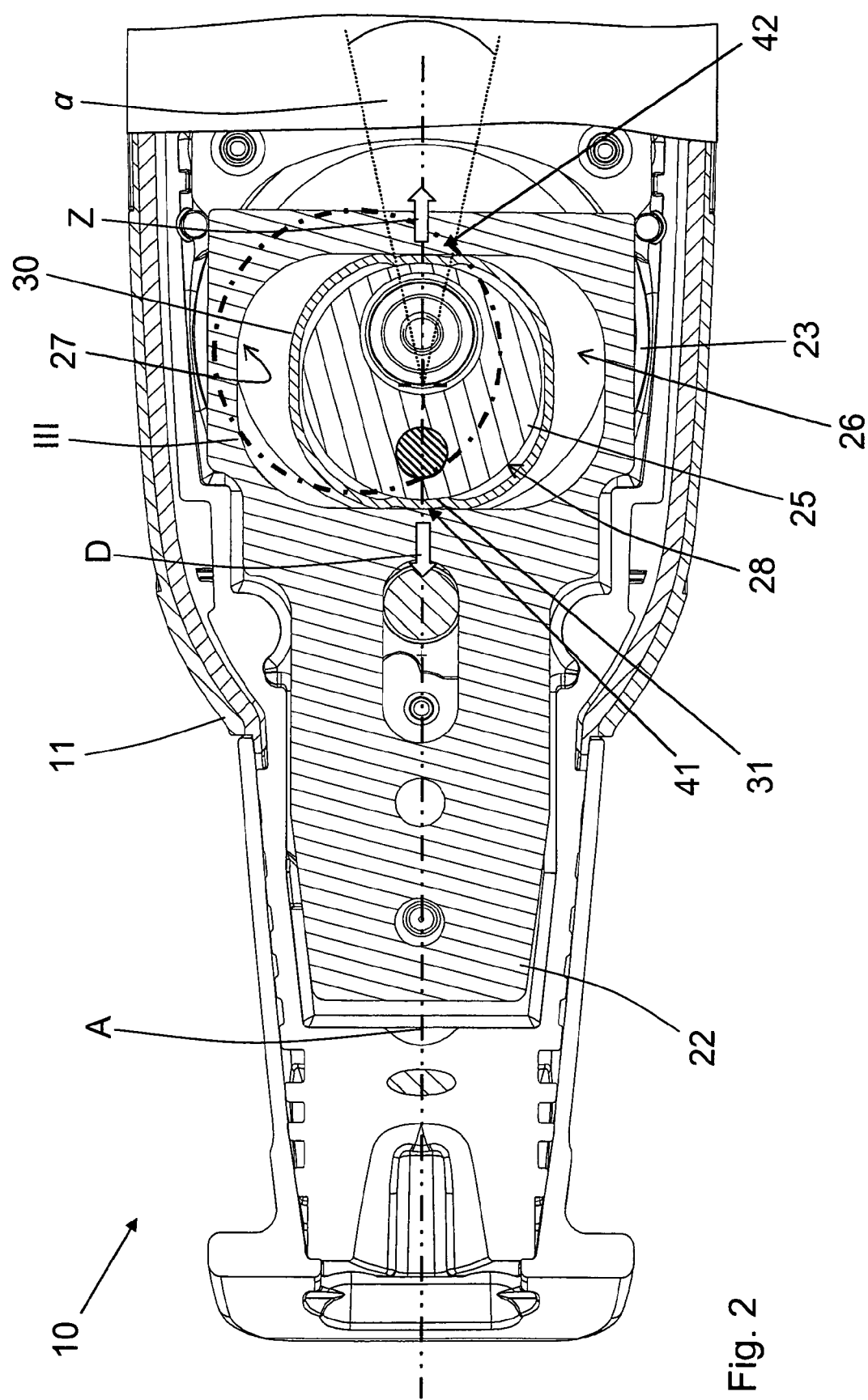
FIG. 2 a cross-sectional view of a portion of the saw shown in FIG. 1 along line II-II.
Figure 3:
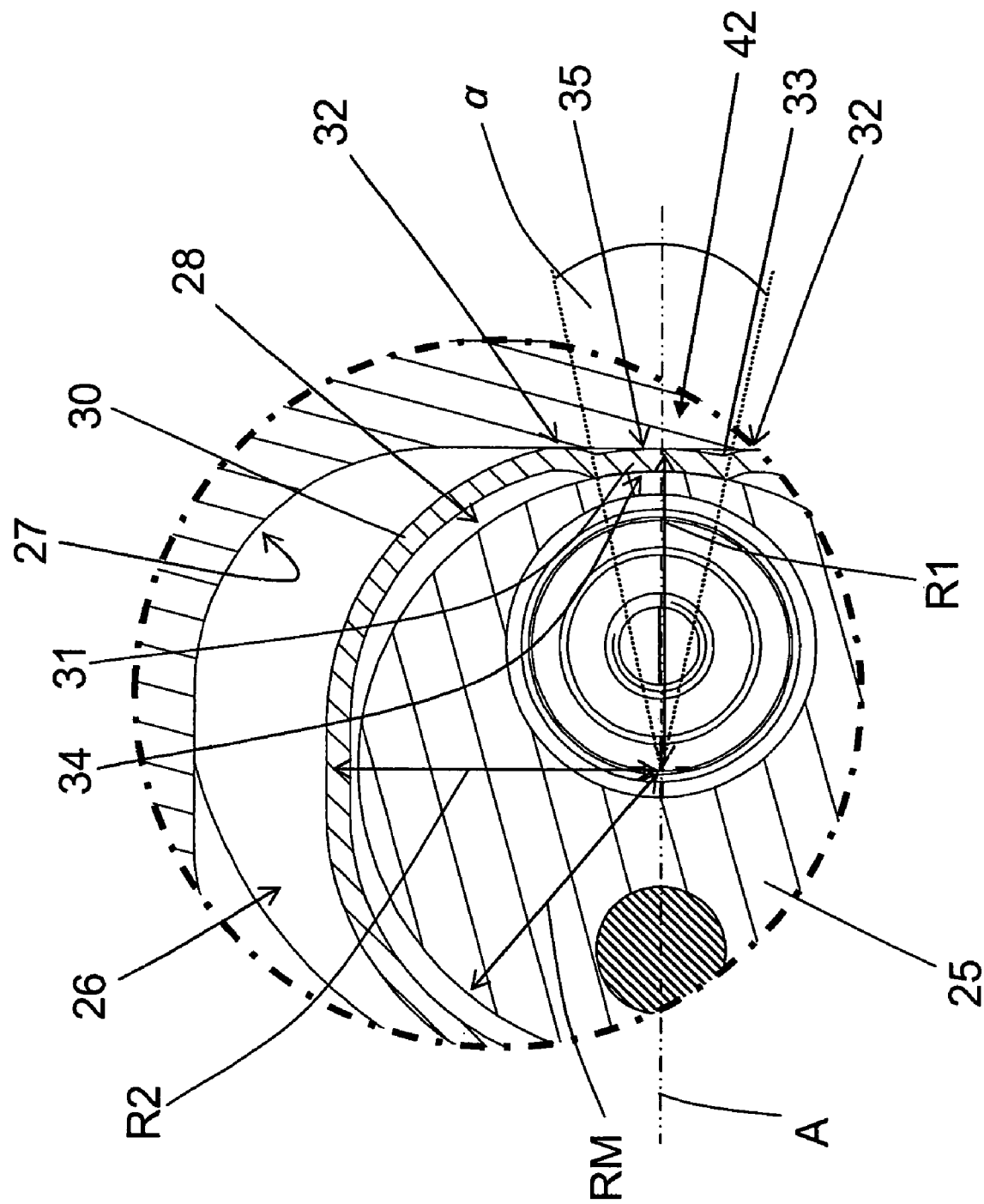
FIG. 3 a view of a section of the saw shown in FIG. 2 and marked by III at an increased, in comparison with FIG. 2, scale.

A hand-held reciprocating power saw 10 according to the present invention, which is formed as a saber saw and is shown in FIGS. 1 through 3, has a one- or multi-part housing 11 and a drive unit generally designated with a reference numeral 16 and located in the housing 11. The drive unit 16 includes a motor 17, e.g., an electric motor, and a reciprocation drive 20 for converting a rotational movement of the motor 17 in a reciprocating movement of a reciprocation member 21 which is formed, e.g., as a push rod, and a compensation mass 22 reciprocating in a direction opposite to the direction the reciprocation member 21 reciprocates. The power supply of the reciprocating power saw 10 is insured by a network connection 19 in form of a cable connectable with a power source. Naturally, an accumulator, or a battery pack, etc. can be provided on the reciprocating power saw 10 for powering the same.

The reciprocating power saw 10 is further provided with a handle 12 on which a switch for actuating the reciprocating power saw 10 is arranged. At the end of the reciprocating power saw 10 opposite the handle 12, there is located a tool holder 14 in which a working tool such as, e.g., a saw blade is secured. The tool holder 14 is arranged on a free end of the reciprocation member 21.

The reciprocation drive 20 includes a transmission member formed as an eccentric wheel 23. The eccentric wheel 23 has a toothed rim with which it engages an output member 18 of the motor 17 such as, e.g., an output gear wheel. The eccentric wheel 23 is rotatably supported in a support, not shown in detail. On the eccentric wheel 23, two eccentrics 24 and 25 are arranged.

The reciprocation member 21 has, in its end region remote from the tool holder 14, an elongate link element 29 which extends transverse to the reciprocation member 21. The first eccentric 24 of the eccentric wheel 23 engages in the link element 29, reciprocatingly moving the reciprocation member 21 (as indicated by a double arrow 40) when the motor 17 is actuated.

The compensation mass 22 is displaceable along an axis A extending along the displacement path of the reciprocation member 21. In its end region remote from the tool holder 14, the compensation mass 22 has an elongate opening 26, a longitudinal axis of which extends transverse to the longitudinal extent of the compensation mass 22 or transverse to the axis A. The second eccentric 25 of the eccentric wheel 23 engages in the opening 26, reciprocating the compensation mass 22 (as indicated by the double arrow 40) when the motor 17 is actuated. The second eccentric 25 has a radially wide outer surface 28. An intermediate member 30, which is formed as a closed annular body, is located between a circumferential wall 27 that surrounds the opening 26 and the outer surface 28 of the second eccentric 25. In the embodiment shown in the drawings, the intermediate member 30 is formed of a spring material, in particular of spring steel. Between the outer surface 28 of the second eccentric 25 and the circumferential wall 27 of the opening 26, there is provided a first contact region 41 in a pressure direction D and a second contact region 42 in a pulling direction Z of the compensation mass 22. The intermediate member 30 has arcuate bearing segments 31 having concave sides 34 with which the intermediate member 30 formlockingly engages the outer surface 28 of the second eccentric 25. The arcuate bearing segments 31 extend over an arc α from 10° to 40°, in particular from 20° to 30°.

In it's widewise direction, the intermediate member 30 has, in the contact regions 41, 42, at least two, spaced from each other, preferably flat, bearing surfaces 32. Between the bearing surfaces 32, there is provided a third bearing surface for the circumferential wall 27 and which engages a respective radially outward convex side 35 of the respective arcuate bearing segments 31. The intermediate member 30 noticeably increases the bearing surfaces to both the eccentric 25 and the circumferential wall 27. This leads to reduced surface load and improved formation of a lubrication film. The provision of haunch spaces 33 between the convex sides 35 adjacent to the bearing surfaces 32 improves formation and retention of a lubricant film because the lubricant an be collected in the haunch spaces 33.

A first radial extension R1 of the intermediate member 30, which is oriented parallel to the axis A, is smaller than a second radial extension R2 of the intermediate member 30 oriented perpendicular to the axis A. The outer surface 28 of the second eccentric 25 is, on the other hand, circular with a uniform radius RM. The radius RM is smaller than or equal to the first radial extension R1 of the intermediate member 30, whereby the bearing of the arcuate bearing segments 31 in the contact regions 41, 42 is insured. In the other regions of the outer surfaces 28 of the second eccentric 25, the intermediate member 30 is spaced from the outer surface 28. This is because the second radial extension R2 of the intermediate member 30 is greater than the radius RM of the outer surface 28 of the second eccentric 25.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held reciprocating power saw (10), comprising a reciprocation drive (20) having a reciprocation member (21) for reciprocatingly moving a working tool; a motor (17) for driving the reciprocation drive (20); a compensation mass (22) reciprocating in directions opposite reciprocation directions of the reciprocation member (21); an eccentric wheel (23) driven by the motor (17) and having a first eccentric (24) for reciprocatingly displacing the reciprocation member (21) and a second eccentric (25) for reciprocating the compensation mass (22) along an axis (A) extending along a displacement path of the reciprocation member (21), the second eccentric (25) having a radially wide outer surface (28) and engaging in an opening (26) provided in the compensation mass (22) and defined by a circumferential wall (27) that surrounds the outer surface (28), whereby between the outer surface (28) of the second eccentric (25) and the circumferential wall (27) there is provided a first contact region (41) in a pressure direction (D) and a second contact region (42) in a pulling direction (Z); and an intermediate member (30) arranged between the circumferential wall (27) defining the opening (26) and the outer surface (28) of the second eccentric (25) at least in the contact regions (41, 42), the intermediate member (30) having a first radial extension (R1) oriented parallel to the axis (A) and a second radial extension (R2) oriented perpendicular to the axis (A) and greater than the first radial extension (R1).

2. A reciprocating power saw according to claim 1, wherein the intermediate member (30) is formed as an annular member forming two arcuate bearing segments (31) located in the two contact regions (41, 42), respectively, and formlockingly engaging with respective concave sides (34) thereof the outer surface (28) of the second eccentric (25).

3. A reciprocating power saw according to claim 2, wherein the arcuate bearing segments (31) each extends over an arc (α) from 10° to 40°.

4. A reciprocating power saw according to claim 3, wherein the arcuate bearing segments (31) each extends over an arc (α) from 20° to 30°.

5. A reciprocating power saw according to claim 1, wherein the intermediate member (30) is formed of spring steel.

6. A reciprocating power saw according to claim 2, wherein the intermediate member (30) has, at least in a region of each arcuate bearing segment (31), at least two bearing surfaces (32) facing the circumferential wall (27) of the opening (26).

\* \* \* \* \*

UNITED STATES PATENT AND TRADEMARK OFFICE
CERTIFICATE OF CORRECTION

PATENT NO. : 8,141,257 B2
APPLICATION NO. : 12/455609
DATED : March 27, 2012
INVENTOR(S) : Guenter Haas It is certified that error appears in the above-identified patent and that said Letters Patent is hereby corrected as shown below:

Title page, item (73) Assignee: should read as follows:

(73)    Hilti Aktiengesellschaft, Shaan (LI)

Signed and Sealed this
Twelfth Day of June, 2012

David J. Kappos
*Director of the United States Patent and Trademark Office*